(12) United States Patent
Seol

(10) Patent No.: US 12,122,345 B2
(45) Date of Patent: Oct. 22, 2024

(54) BRAKING DEVICE FOR VEHICLE AND BRAKING METHOD THEREFOR

(71) Applicant: HYUNDAI MOBIS CO., LTD., Seoul (KR)

(72) Inventor: Yong Cheol Seol, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 623 days.

(21) Appl. No.: 17/344,897

(22) Filed: Jun. 10, 2021

(65) Prior Publication Data

US 2021/0394729 A1 Dec. 23, 2021

(30) Foreign Application Priority Data

Jun. 22, 2020 (KR) .................. 10-2020-0075529

(51) Int. Cl.
*B60T 13/68* (2006.01)
*B60T 8/1761* (2006.01)
*B60T 8/88* (2006.01)

(52) U.S. Cl.
CPC .......... *B60T 8/885* (2013.01); *B60T 8/17616* (2013.01); *B60T 13/686* (2013.01)

(58) Field of Classification Search
CPC ..... B60T 8/885; B60T 8/17616; B60T 13/686
(Continued)

(56) References Cited

U.S. PATENT DOCUMENTS 3,831,703 A * 8/1974 Fontaine ............... B60T 11/103
180/271

6,354,672 B1 * 3/2002 Nakamura ............ B60T 8/4081
303/114.1
(Continued)

FOREIGN PATENT DOCUMENTS

CN        109843669 A      6/2019
DE    102018220578 A1      6/2019
(Continued)

OTHER PUBLICATIONS

German Office Action Issued Feb. 15, 2022 in corresponding German Patent Application No. 102021115428.6.
(Continued)

*Primary Examiner* — Hung Q Nguyen
*Assistant Examiner* — Anthony Donald Taylor, Jr.
(74) *Attorney, Agent, or Firm* — NovoTechIP International PLLC

(57) ABSTRACT

A braking device for a vehicle and a method of controlling a braking device for a vehicle are disclosed. The present disclosure in at least one embodiment provides a method of controlling a braking device for a vehicle having a first wheel brake, a second wheel brake, a third wheel brake, and a fourth wheel brake for vehicle braking, including determining whether a first braking unit operates normally upon determining that a braking situation has occurred while driving the vehicle, and braking the vehicle, upon determining that the first braking unit fails to operate normally, by supplying hydraulic pressure to the third wheel brake and the fourth wheel brake by operating a second braking unit, and preventing wheel locks of a first wheel and a second wheel provided on the vehicle by opening a pressure-reducing valve upon determining that a driver has intervened in the braking situation.

8 Claims, 8 Drawing Sheets

(58) Field of Classification Search
USPC .......................................................... 701/70
See application file for complete search history.

(56) References Cited

U.S. PATENT DOCUMENTS

| | | | | |
|---|---|---|---|---|
| 6,450,591 | B1* | 9/2002 | Kawahata | B60T 8/3655 303/122.05 |
| 6,899,403 | B2* | 5/2005 | Isono | B60T 8/4018 303/114.1 |
| 6,913,326 | B1* | 7/2005 | Ohkubo | B60T 8/405 303/119.2 |
| 7,779,968 | B2* | 8/2010 | Noh | B60T 13/746 475/67 |
| 9,205,821 | B2* | 12/2015 | Biller | B60T 13/686 |
| 11,203,331 | B2* | 12/2021 | Kato | B60T 17/221 |
| 2004/0061376 | A1* | 4/2004 | Yoshino | B60T 13/686 303/113.1 |
| 2008/0048491 | A1* | 2/2008 | Matsubara | B60T 8/36 303/14 |
| 2013/0241275 | A1* | 9/2013 | Miyazaki | B60T 8/4081 303/6.01 |
| 2013/0249274 | A1* | 9/2013 | Miyazaki | B60T 13/662 303/6.01 |
| 2014/0306515 | A1* | 10/2014 | Claussen | B60T 8/328 303/116.1 |
| 2016/0159332 | A1* | 6/2016 | Yang | B60T 8/4018 303/15 |
| 2017/0072927 | A1* | 3/2017 | Jeon | B60T 7/042 |
| 2017/0158180 | A1* | 6/2017 | Kim | B60T 13/146 |
| 2018/0056953 | A1* | 3/2018 | Kato | B60T 13/662 |
| 2019/0016321 | A1* | 1/2019 | Dinkel | B60T 8/4081 |
| 2019/0241167 | A1* | 8/2019 | Peichl | B60T 13/165 |
| 2019/0283720 | A1* | 9/2019 | Nijakowski | B60T 7/12 |
| 2021/0016785 | A1* | 1/2021 | Nakagawa | B60W 60/001 |

FOREIGN PATENT DOCUMENTS

| | | |
|---|---|---|
| DE | 112019001312 T5 | 12/2020 |
| JP | H07144634 A | 6/1995 |

OTHER PUBLICATIONS

Office Action issued Jun. 13, 2023 in corresponding Chinese Patent Application No. 202110694782.3.

* cited by examiner

BRAKING DEVICE FOR VEHICLE AND BRAKING METHOD THEREFOR

CROSS-REFERENCE TO RELATED APPLICATIONS

This application is based on, and claims priority from, Korean Patent Application Number 10-2020-0075529, filed Jun. 22, 2020, the disclosure of which is incorporated by reference herein in its entirety.

TECHNICAL FIELD

The present disclosure in some embodiments relates to a braking device for a vehicle and a braking method therefor.

BACKGROUND

The statements in this section merely provide background information related to the present disclosure and do not necessarily constitute prior art.

With the ongoing development of autonomous vehicles, higher demand for driving safety has come along. Vehicles are provided with a first braking unit and a second braking unit wherein the first braking unit operates alone to supply a braking force to the respective wheel brakes normally until an abnormality occurs therein, when the second braking unit is triggered to operate to ensure the stability of the vehicle driving and braking.

Adding the second braking unit adversely affects cost control. To save cost, the second braking unit is downsized so that it hydraulically brakes only two of the wheels of the vehicle. An electronic parking brake (EPB) device is used to brake the remaining two wheels that the second braking unit cannot control. However, in this case, when the vehicle is in autonomous driving and a situation requires the second braking unit to engage in a sudden braking, the remaining two wheels out of control of the second braking unit are supplied with hydraulic pressure generated from a backup master cylinder by the driver's brake pedal depression. Failure to depressurize the hydraulic pressure could cause a wheel lock to occur, especially on a low-friction road surface, leading to an accident.

SUMMARY

According to at least one embodiment, the present disclosure provides a braking device for a vehicle having a first wheel brake, a second wheel brake, a third wheel brake, and a fourth wheel brake for vehicle braking, including a first braking control, a first braking unit, a second braking control, and a second braking unit. The first braking control is configured to generate a first hydraulic braking signal and a first valve open/close signal for braking of the vehicle in the braking situation of the vehicle. The first braking unit includes a reservoir, a backup master cylinder, a main master cylinder, and a pressure-reducing valve disposed between the reservoir and the backup master cylinder and is configured to be responsive to the first valve open/close signal for regulating a valve between open and closed states and to supply a hydraulic braking force corresponding to the first hydraulic braking signal to first to fourth wheel brakes. The second braking control is configured to be responsive to an abnormal operation occurring in the first braking unit for generating a second hydraulic braking signal and a second valve open/close signal in place of the first braking control generating the first hydraulic braking signal and the first valve open/close signal. The second braking unit is configured to be responsive to the second valve open/close signal for regulating a valve between open and closed states and to supply a hydraulic braking force corresponding to the second hydraulic braking signal to the third wheel brake and the fourth wheel brake. Here, the second braking control is configured to be responsive to an abnormal operation occurring in the first braking unit for taking control over opening and closing the pressure-reducing valve from the first braking control and to depressurize a hydraulic pressure supplied to the first wheel brake and the second wheel brake when the second braking unit is driven.

According to another embodiment, the present disclosure provides a braking device for a vehicle having a first wheel brake, a second wheel brake, a third wheel brake, and a fourth wheel brake for vehicle braking, including a first braking control, a first braking unit, a second braking control, and a second braking unit. The first braking control is configured to generate a first hydraulic braking signal and a first valve open/close signal for braking of the vehicle in the braking situation of the vehicle. The first braking unit includes first to fourth inlet valves and a first outlet valve, a second outlet valve, a third outlet valve, and a fourth outlet valve arranged to control a hydraulic pressure supplied to first to fourth wheel brakes and is configured to be responsive to the first valve open/close signal for regulating a valve between open and closed states and to supply a hydraulic braking force corresponding to the first hydraulic braking signal to the first to fourth wheel brakes. The second braking control is configured to be responsive to an abnormal operation occurring in the first braking unit for generating a second hydraulic braking signal and a second valve open/close signal in place of the first braking control generating the first hydraulic braking signal and the first valve open/close signal. The second braking unit is configured to be responsive to the second valve open/close signal for regulating a valve between open and closed states and to supply a hydraulic braking force corresponding to the second hydraulic braking signal to the third wheel brake and the fourth wheel brake. Here, the second braking control is configured to be responsive to an abnormal operation occurring in the first braking unit for taking control over opening and closing the first outlet valve and the second outlet valve from the first braking control and to depressurize a hydraulic pressure supplied to the first wheel brake and the second wheel brake when the second braking unit is driven.

According to yet another embodiment, the present disclosure provides a method of controlling a braking device for a vehicle having a first wheel brake, a second wheel brake, a third wheel brake, and a fourth wheel brake for vehicle braking, including determining whether a first braking unit operates normally upon determining that a braking situation has occurred while driving the vehicle, and braking the vehicle, upon determining that the first braking unit fails to operate normally, by supplying hydraulic pressure to the third wheel brake and the fourth wheel brake by operating a second braking unit, and preventing wheel locks of a first wheel and a second wheel provided on the vehicle by opening a pressure-reducing valve upon determining that a driver has intervened in the braking situation.

DETAILED DESCRIPTION

Figure 1:
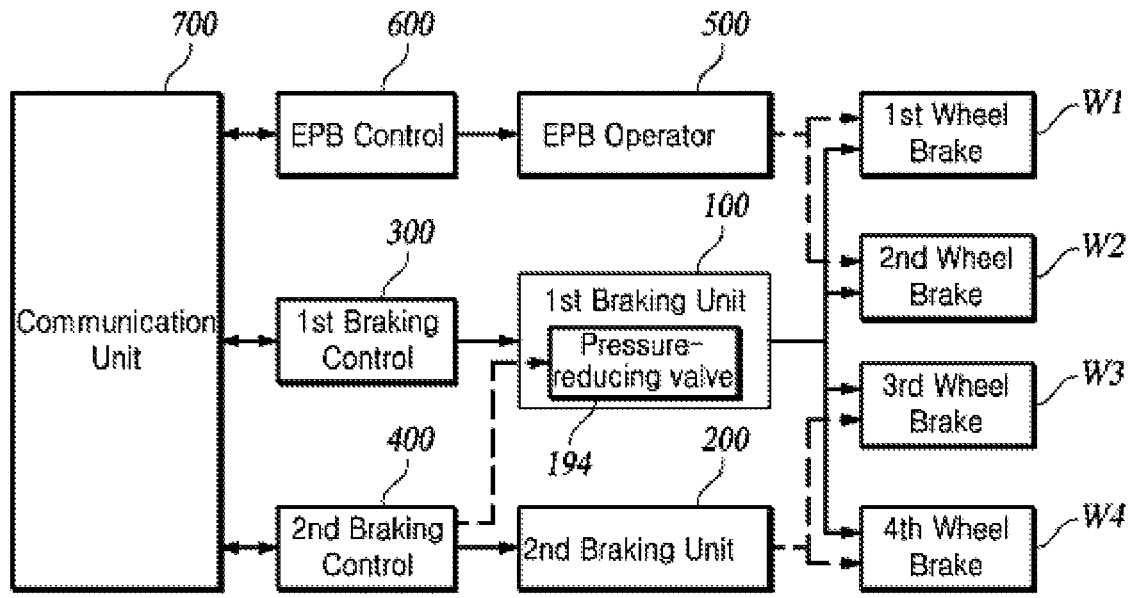
FIG. 1 is a block diagram of a vehicle braking device when a first braking unit normally operates according to at least one embodiment of the present disclosure.

The present disclosure seeks to prevent a wheel lock by providing a first braking unit with a pressure-reducing valve among other valves so that the pressure-reducing valve is controlled by a second braking control.

Further, the present disclosure seeks to prevent the wheel lock by allowing the second braking control to control a first outlet valve and a second outlet valve among valves disposed in the first braking unit.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

In the present specification, the terms 'left' and 'right' are only used to indicate a direction in which certain elements are shown in the drawings, and the present disclosure is not limited to the illustrated orientations and positions thereof.

Figure 2:
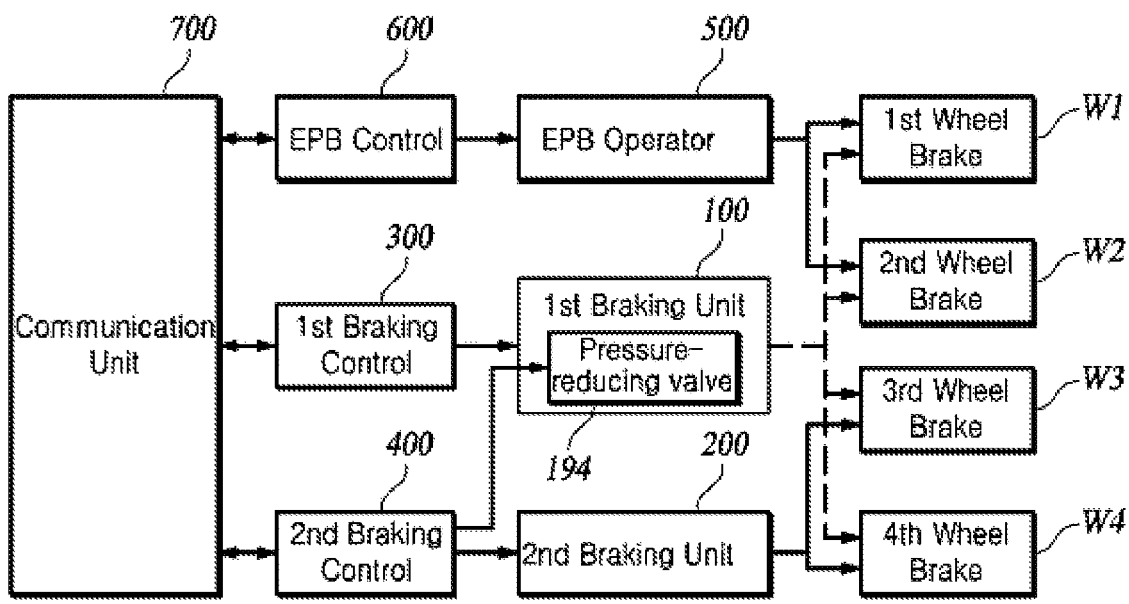
FIG. 2 is a block diagram of the vehicle braking device when the first braking unit operates abnormally according to at least one embodiment of the present disclosure.
Figure 3:
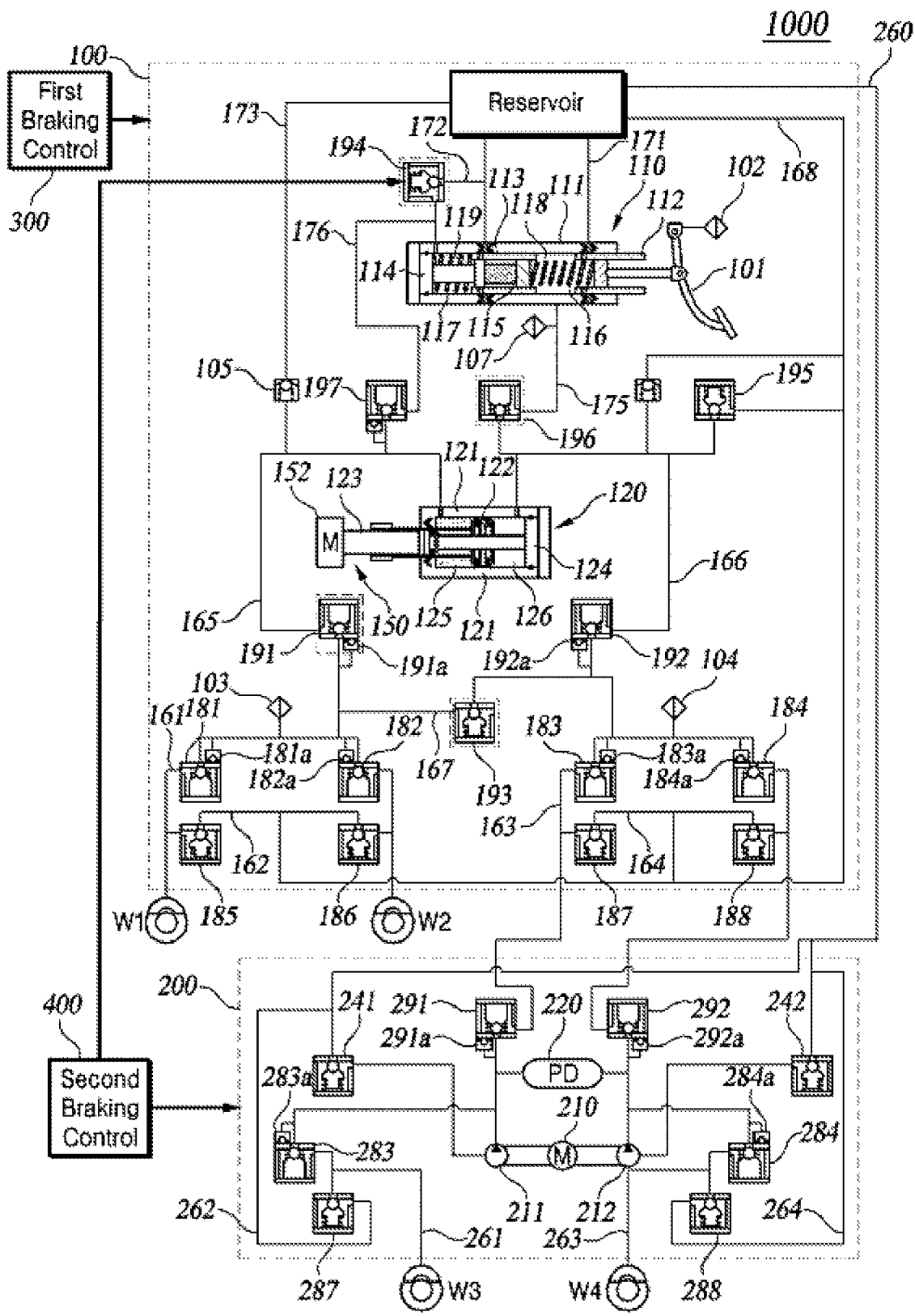
FIG. 3 is a block diagram of a vehicle braking device according to at least one embodiment of the present disclosure.

FIG. 1 is a block diagram of a vehicle braking device when a first braking unit normally operates according to at least one embodiment. FIG. 2 is a block diagram of the vehicle braking device when the first braking unit operates abnormally according to at least one embodiment. FIG. 3 is a block diagram of a vehicle braking device according to at least one embodiment of the present disclosure.

As shown in FIGS. 1 to 3, a braking device 1000 for a vehicle includes all or some of a first braking unit 100, a second braking unit 200, a first braking control 300, a second braking control 400, an electronic parking brake (EPB) operator 500, an EPB control 600, a communication unit 700, and a plurality of wheel brakes w1, w2, w3, and w4.

A plurality of wheel brakes w1, w2, w3, w4 includes a first wheel brake w1 for braking a rear left wheel of the vehicle, a second wheel brake w2 for braking a rear right wheel, a third wheel brake w3 for braking a front left wheel, and a fourth wheel brake w4 for braking a front right wheel. Here, the first to fourth wheel brakes w1 to w4 are formally defined for convenience of description, and the respective positions of the wheel brakes are not limited to those as defined above.

The following describes the first braking unit 100 in detail.

The first braking unit 100 includes all or some of a backup master cylinder 110, a main master cylinder 120, first to fourth inlet valves 181, 182, 183, 184, and first to fourth outlet valves 185, 186, 187, 188, a mixing valve 193, a pressure-reducing valve 194 above the backup master cylinder 110, first to third backup valves 195, 196, 197, and first and second main control valves 191, 192.

The backup master cylinder 110 includes all or some of a backup body 111, a first backup piston 112, a second backup piston 113, a backup stopper 114, a reaction force damper 115, a first elastic member 116, and a second elastic member 117.

The backup body 111 is formed into a structure having an internal hollow. The first backup piston 112 and the second backup piston 113 are disposed in the inner space of the backup body 111 to be able to move left and right linearly. A first backup chamber 118 is defined by an internal space of the backup body 111 between the first backup piston 112 and the second backup piston 113. A second backup chamber 119 is defined by an internal space of the backup body 111 between the second backup piston 113 and the backup stopper 114.

The backup body 111 is formed to be open at its left and right ends. Inserted into the open right end of the backup body 111 is the left end of the first backup piston 112. Then, the open right end of the backup body 111 is closed by the first backup piston 112. Protruding from the right end of the backup body 111 is the right end of the first backup piston 112, to which a brake pedal 101 is connected. The brake pedal 101 may be provided with a stroke sensor 102 that detects the amount of pedal stroke of the brake pedal 101 when the driver steps thereon. The first backup piston 112 is arranged to be linearly moved left and right while in close contact with the inner wall of the backup body 111.

The backup stopper 114 is arranged such that the right end of the backup stopper 114 is adjacent to the open left end of the backup body 111. Then, the backup stopper 114 has its right end inserted into the open left end of the backup body 111 to close the same open left end.

The second backup piston 113 is disposed inside the backup body 111 to move linearly to the left and right while in close contact with the inner wall of the backup body 111. The second backup piston 113 is disposed to be spaced apart from the first backup piston 112 and the backup stopper 114.

The second backup piston 113 is formed in an empty structure. The second backup piston 113 is formed such that the right side facing the first backup piston 112 is blocked, and the left side facing the backup stopper 114 is opened.

The first elastic member 116 is disposed between the first backup piston 112 and the second backup piston 113. The first elastic member 116 may be formed of a spring. The first elastic member 116 has one end elastically supporting the first backup piston 112 and the other end elastically supporting the second backup piston 113.

The second elastic member 117 is disposed between the second backup piston 113 and the backup stopper 114. The second elastic member 117 may be formed of a spring. The second elastic member 117 has one end elastically supports the second backup piston 113 and the other end elastically supports the backup stopper 114.

The reaction force damper 115 is disposed inside the second backup piston 113. The reaction force damper 115 has one end supported by the right end of the backup stopper 114 and the other end supported by the inner surface of the right end of the second backup piston 113. When the driver steps on the brake pedal 101, the reaction force damper 115 moves to the left in the second backup piston 113, and at this time, the reaction force damper 115 is compressed to allow the driver to feel a reaction force. The reaction damper 115 may be formed of a rubber or a spring, and it can give the sense of reaction force by the elastic resilience of the rubber or spring to a driver who steps on the brake pedal 101.

The main master cylinder 120 includes all or some of a main body 121, a main piston 122, an actuator 150, and a main stopper 124.

The main body 121 is formed into a structure having an internal hollow. The main piston 122 is arranged to be linearly moved left and right in the inner space of the main body 121. The inner space of the main body 121 is divided into two spaces by the main piston 122. A first main chamber 125 is defined by the inner space of the main body 121 at the left of the main piston 122. A second main chamber 126 is defined by the inner space of the main body 121 at the right of the main piston 122.

The main piston 122 advancing to the right widens the first main chamber 125 and narrows the second main chamber 126. Conversely, when moving back to the left, the main piston 122 narrows the first main chamber 125 and widens the second main chamber 126.

The main body 121 is opened at its left end and its right end. The right end of the main body 121 is completely open, and the left end of the main body 121 is open partially at its center.

The actuator 150 includes a motor 152, a male screw 123, and a female screw (not shown). The male screw 123 is arranged to have its right end inserted into the open left end of the main body 121. The right end of the male screw 123 is connected to the main piston 122 inside the main body 121. The male screw 123 may be integrally formed with the main piston 122. The male screw 123 is formed to have a diameter smaller than the diameter of the main piston 122. The female screw (not shown) has a spiral formation on its inner circumferential surface. The male screw 123 has, on its outer circumferential surface, a spiral formation that meshes with the spiral formation of the female screw and is inserted into the female screw.

The left end of the male screw 123 protrudes from the left end of the main body 121, the protruding left end being installed with a motor 152 for linearly moving the male screw 123 left and right. The male screw 123 is connected to the rotor shaft of the motor 152. With the rotor shaft of the motor 152, the male screw 123 corotates and thereby moves linearly. In other words, the male screw 123 and the female screw may convert the rotational motion of the motor 152 into a linear motion, allowing the main piston 122 connected to the male screw 123 to move linearly left and right.

The main stopper 124 has its left end inserted in the open right end of the main body 121. Accordingly, the open right end of the main body 121 is closed by the main stopper 124.

The main piston 122 is adapted to be linearly moved left and right while in close contact with the inner wall of the main body 121. Specifically, the main piston 122 has outer circumferential surfaces, the center of which is in close contact with the inner wall of the main body 121, and the left and right ends of which are spaced apart from the inner wall of the main body 121. The main piston 122 has a hollow center. The male screw 123 is also formed to have a hollow center. The main stopper 124 is arranged to penetrate both the main piston 122 and the male screw 123.

The first main chamber 125 includes the main piston 122 and the male screw 123, but the male screw 123 is not disposed in the second main chamber 126. Accordingly, when the main piston 122 advances to the right, the effective cross-sectional area of the second main chamber 126 is formed larger than that of the first main chamber 125.

The main master cylinder 120 generates hydraulic pressure by rotation of the motor 152 and supplies the generated hydraulic pressure to a plurality of wheel brakes w1, w2, w3, w4. Specifically, when the driver steps on the brake pedal 101, the stroke sensor 102 detects the stroke of the brake pedal 101 and transmits a detection signal to the first braking control 300 which then calculates, based on the received detection signal, the amount of pedal stroke of the brake pedal 101. The first braking control 300 may control the motor 152 based on the calculated pedal stroke amount and thereby control the hydraulic pressure generated by the main master cylinder 120.

The following describes in detail the braking structure using hydraulic pressure of the first braking unit 100 including the backup master cylinder 110 and the main master cylinder 120.

The first braking unit 100 includes a first main flow path 165 having one end connected to the first main chamber 125. Specifically, one end of the first main flow path 165 is connected to the main body 121 to receive hydraulic pressure transmitted from the first main chamber 125.

The first main flow path 165 has its opposite end installed with the first main control valve 191 for opening and closing the first main flow path 165. The first main control valve 191 may regulate hydraulic pressure supplied from the backup master cylinder 110 or the main master cylinder 120. The first main control valve 191 is a solenoid valve capable of opening and closing the first main flow path 165 according to a control signal of the first braking control 300. For example, the first main control valve 191 may be disposed in a flow path that supplies hydraulic pressure of the first main chamber 125 to the first and second wheel brakes w1 and w2. The first main control valve 191 is further installed with a first main control check valve 191*a*. The first main control check valve 191*a* is opened when the hydraulic pressure in the first main chamber 125 is higher than a certain pressure and serves as a bypass for supplying the hydraulic pressure in the first main chamber 125 to the first and second wheel brakes w1 and w2 while the first main control valve 191 is closed.

The first braking unit 100 includes a second main flow path 166 having one end connected to the second main chamber 126. Specifically, one end of the second main flow path 166 is connected to the main body 121 to receive hydraulic pressure transmitted from the second main chamber 126.

The second main flow path 166 has its opposite end installed with the second main control valve 192 for opening and closing the second main flow path 166. The second main control valve 192 is a solenoid valve capable of opening and closing the second main flow path 166 according to a control signal of the first braking control 300. For example, the second main control valve 192 may be disposed in a flow path that supplies hydraulic pressure of the second main chamber 126 to the third and fourth wheel brakes w3 and w4. The second main control valve 192 is further installed with a second main control check valve 192*a*. The second main control check valve 192*a* is opened when the hydraulic pressure in the second main chamber 126 is higher than a certain pressure and serves as a bypass for supplying the hydraulic pressure in the second main chamber 126 to the third and fourth wheel brakes w3 and w4 while the second main control valve 192 is closed.

The first braking unit 100 includes a first brake flow path 161 having one end, at which the first main control valve 191 is disposed. The first main control valve 191 is disposed between the first main flow path 165 and the first brake flow path 161. Installed in the first brake flow path 161 are a first inlet valve 181 capable of regulating a hydraulic pressure delivered to the first wheel brake w1 and a second inlet valve 182 capable of regulating a hydraulic pressure delivered to the second wheel brake w2. The first inlet valve 181 and the second inlet valve 182 are solenoid valves capable of opening and closing the first brake flow path 161 according to a control signal from the first braking control 300. The first inlet valve 181 and the second inlet valve 182 may include a first inlet check valve 181a and a second inlet check valve 182a, respectively. The first inlet check valve 181a and the second inlet check valve 182a are adapted to prevent hydraulic oil from refluxing in the opposite direction away from the first wheel brake w1 and the second wheel brake w2.

The first wheel brake w1 and the second wheel brake w2 are disposed at the other end of the first brake flow path 161. Between the first brake flow path 161 and a first return flow path 162 further included, a first outlet valve 185 and a second outlet valve 186 are disposed. The first outlet valve 185 and the second outlet valve 186 are solenoid valves arranged to open and close as controlled by a control signal from the first braking control 300 to recover the hydraulic oil provided to the first wheel brake w1 and the second wheel brake w2. The first outlet valve 185 and the second outlet valve 186 may be connected to not only the first braking control 300 but also the second braking control 400 in parallel, to be controlled by the second braking control 400, too.

For example, when the driver depresses the brake pedal 101 or when a braking situation occurs during autonomous driving of a vehicle, the first braking control 300 may control the first inlet valve 181 and the inlet valve 182 to open for providing a braking force to the first wheel brake w1 and the second wheel brake w2. Conversely, after the driver finishes depressing the brake pedal 101 or after the braking situation is ended during autonomous vehicle driving, the first braking control 300 controls to close the first inlet valve 181 and the second inlet valve 182 for blocking the hydraulic pressure from activating the first wheel brake w1 and the second wheel brake w2 and to open the first outlet valve 185 and the second outlet valve 186 for recovering the hydraulic oil.

The first return flow path 162 is a flow path for transferring the recovered hydraulic oil to a reservoir included in the first braking unit 100. Here, the reservoir is an oil tank for storing the hydraulic oil.

The first braking unit 100 further includes a second brake flow path 163, a second return flow path 164, a third inlet valve 183, a fourth inlet valve, 184, a third inlet check valve 183a, a fourth inlet check valve 184a, a third outlet valve 187, a fourth outlet valve 188, the third wheel brake w3, and the fourth wheel brake w4, the respective operations and interconnections of which are the same as those of the first and second wheel brakes w1, w2 and the associated hydraulic components described above, so repetitive description thereof will be omitted.

Unlike the first brake flow path 161, the second brake flow path 163 does not directly supply hydraulic pressure to the third wheel brake w3 and the fourth wheel brake w4 but indirectly supplies the same through the second braking unit 200. A detailed description of the second braking unit 200 will be presented below.

The first braking unit 100 further includes a third return flow path 168 having one end connected to the reservoir. The other end of the third return flow path 168 is branched into two, one of which is connected to the first return flow path 162 and the other being connected to the second return flow path 164. Between the third recovery flow path 168 and the second main flow path 166, the first backup valve 195 is installed for opening and closing the flow path therebetween. The first backup valve 195 is a solenoid valve.

A mixing flow path 167 is provided having one end thereof connected to the first brake flow path 161 and the other end connected to the second brake flow path 163. The mixing flow path 167 is installed with a mixing valve 193 capable of opening and closing the mixing flow path 167 following a control signal from the first braking control 300. The mixing valve 193 is a solenoid valve.

A supply flow path 173 is provided having one end connected to the reservoir and the other end installed with a supply check valve 105. Here, the supply check valve 105 prevents a reflux of the hydraulic oil that is supplied from the reservoir to the first main flow path 165.

A first backup flow path 171 is provided having one end connected to the reservoir and the other end connected to the first backup chamber 118. So, the first backup flow path 171 is connected to the backup body 111 to be in communication with the first backup chamber 118 so that hydraulic oil can pass between the reservoir and the first backup chamber 118.

A second backup flow path 172 is provided having one end connected to the reservoir and the other end connected to the second backup chamber 119. So, the second backup flow path 172 is connected to the backup body 111 to be in communication with the second backup chamber 119 so that hydraulic oil can pass between the reservoir and the second backup chamber 119.

A third backup flow path 175 is provided having its one end connected to the first backup chamber 118. Accordingly, the third backup flow path 175 is connected to the backup body 111 to be in communication with the first backup chamber 118 for allowing hydraulic oil supplied from the first backup chamber 118 to pass. The second backup valve 196 for opening and closing the third backup flow path 175 is disposed at the other end of the third backup flow path 175. The third backup flow path 175 between the backup body 111 and the third backup valve 197 is installed with a third pressure sensor 107.

A fourth backup flow path 176 is provided having its one end connected to the second backup chamber 119. So, the fourth backup flow path 176 is connected to the backup body 111 to be in communication with the second backup chamber 119 for allowing hydraulic oil supplied from the second backup chamber 119 to pass. The fourth backup flow path 176 has the other end installed with the third backup valve 197 for opening and closing the fourth backup flow path 176. The first to third backup valves 195, 196, and 197 may regulate hydraulic pressure between the backup master cylinder 110 and the main master cylinder 120.

Disposed between the second backup flow path 172 and the fourth backup flow path 176, the pressure-reducing valve 194 controls the opening and closing of the flow path therebetween. The pressure-reducing valve 194 and the first to third backup valves 195, 196, 177 are solenoid valves that control the opening and closing of the relevant flow paths according to control signals from the first braking control 300. Here, the pressure-reducing valve 194 serves to prevent an increase in the amount of hydraulic pressure formed in the second backup chamber 119 beyond a predetermined level. To maintain the hydraulic pressure applied to the fourth backup flow path 176 at or below the predetermined level, the first braking control 300 may control the opening and closing of the pressure-reducing valve 194. Additionally, the pressure-reducing valve 194 may be controlled by the second braking control 400. When the first braking unit 100 is normally operated, opening and closing of the pressure-reducing valve 194 is controlled by the first braking control 300. On the other hand, when an abnormality occurs in the operation of the first braking unit 100, the second braking control 400 takes over the control over the opening and closing of the pressure-reducing valve 194. With a parallel design incorporating the second braking control 400 to participate in controlling the pressure-reducing valve 194, the second braking control 400 becomes entitled to prevent wheel locks of the first and second wheel brakes w1 and w2. A control method for preventing wheel locks of the first and second wheel brakes w1 and w2 will be described below.

The following describes the second braking unit 200 in detail.

The second braking unit 200 includes all or some of a hydraulic motor 210, first and second hydraulic pumps 211 and 212, a pulsation dampener 220, fifth and sixth inlet valves 283 and 284, fifth and sixth outlet valves 287 and 288, first and second traction control valves 291 and 292, and first and second high-pressure switch valves 241 and 242.

The hydraulic motor 210 provides a driving force to the first and second hydraulic pumps 211 and 212. The first and second hydraulic pumps 211 and 212 have their outlets discharge hydraulic oil by using the driving force provided from the hydraulic motor 210. The number of hydraulic pumps linked with the hydraulic motor 210 is not limited to two, and one or three or more hydraulic pumps may be provided.

The pulsation dampener 220 is disposed between a third brake flow path 261 and a fourth brake flow path 263 further included in the second braking unit 200 to absorb the pressure shock of hydraulic oil and thus reduce the pressure pulsation. The pulsation dampener 220 is capable of expanding the inner space thereof for absorbing the pressure shock of hydraulic oil.

The fifth inlet valve 283 controls the opening and closing of the third brake flow path 261 that transmits hydraulic pressure to the third wheel brake w3, and the sixth inlet valve 284 controls the opening and closing of the fourth brake flow path 263 that transmits hydraulic pressure to the fourth wheel brake w4. The fifth inlet valve 283 and the sixth inlet valve 284 are solenoid valves that are controllably opened and closed by the second braking control 400.

The fifth inlet valve 283 and the sixth inlet valve 284 may include a fifth inlet check valve 283 and a sixth inlet check valve 284. The fifth inlet check valve 283a and the sixth inlet check valve 284a are adapted to prevent hydraulic oil from refluxing in the opposite direction away from the third wheel brake w3 and the fourth wheel brake w4.

The fifth outlet valve 287 is connected to a fourth return flow path 262 further provided and opens to move the hydraulic pressure to the reservoir upon completion of the braking situation. The sixth outlet valve 288 is connected to a fifth return flow path 264 further provided and opens to move the hydraulic pressure to the reservoir upon completion of the braking situation.

The first traction control valve 291 and the second traction control valve 292 are each connected to one end of each second brake flow path 163 of the first braking unit 100 to regulate the hydraulic pressure delivered to the third brake flow path 261 and the fourth brake flow path 263. Therefore, the first traction control valve 291 and the second traction control valve 292 may regulate the hydraulic pressure supplied from the first braking unit 100 to the second braking unit 200.

When the first braking unit 100 operates normally, the hydraulic motor 210 of the second braking unit 200 does not operate. Accordingly, the second braking control 400 transmits a control signal to open the first traction control valve 291 and the second traction control valve 292 to deliver the hydraulic pressure transmitted from the first braking unit 100 to the third and fourth wheel brakes w3 and w4. When an abnormality occurs in the operation of the first braking unit 100, the second braking control 400 transmits a control signal to close the first traction control valve 291 and the second traction control valve 292 to regulate the hydraulic pressure transmitted from the braking unit 100. Accordingly, the third and fourth wheel brakes w3 and w4 are supplied with hydraulic pressure by the second braking unit 200.

The first traction control valve 291 is installed with a first traction control check valve 291a. The first traction control check valve 291a is opened when the hydraulic pressure in the second brake flow path 163 is above a certain pressure to serve as a bypass with the first traction control valve 291 closed for allowing the hydraulic pressure in the second brake flow path 163 to be supplied to the third and fourth wheel brakes w3 and w4. Similarly, a second traction check valve 292a is installed on the second traction control valve 292.

The first high-pressure switch valve 241 is disposed between the third main flow path 260 and the third brake flow path 261. The second high-pressure switch valve 242 is disposed between the third main flow path 260 and the fourth brake flow path 263. The first high-pressure switch valve 241 and the second high-pressure switch valve 242 are solenoid valves that receive a control signal from the second braking control 400 and regulate the hydraulic pressure supplied from the reservoir. So, the first high-pressure switch valve 241 and the second high-pressure switch valve 242 may regulate hydraulic pressure supplied from the reservoir to the second braking unit 200. During the normal operation of the first braking unit 100, the second braking control 400 blocks hydraulic pressure by transmitting a control signal for closing the first high-pressure switch valve 241 and the second high-pressure switch valve 242. Conversely, when an abnormality occurs in the operation of the first braking unit 100, the second braking control 400 transmits a control signal for opening the first high-pressure switch valve 241 and the second high-pressure switch valve 242 to allow hydraulic pressure to pass.

The following describes the rest of the configuration except for the first braking unit 100 and the second braking unit 200 in detail.

The first braking control 300 may be configured to generate a first hydraulic brake signal and a first valve open/close signal for braking of the vehicle in a vehicle braking situation. Here, the first hydraulic braking signal is a signal transmitted from the first braking control 300 to the first braking unit 100 and is a signal for the first braking unit 100 to drive the actuator 150 to generate hydraulic pressure. Here, the first valve open/close signal is a signal transmitted from the first braking control 300 to the first braking unit 100 for controlling the opening and closing of various valves installed in the first braking unit 100. The first braking unit 100 may control the opening and closing of the valve by the first valve open/close signal and supply hydraulic braking force corresponding to the first hydraulic braking signal to the plurality of wheel brakes w1 to w4.

The first braking control 300 may control the valves included in the first braking unit 100 and the actuator 150 of the main master cylinder 120. In particular, the first braking control 300 may control the hydraulic flow in the flow path in the first braking unit 100 by transmitting a signal for controlling the opening and closing of the valves included in the first braking unit 100. Additionally, the first braking control 300 can diagnose whether the first braking unit 100 has a failure, and it may transmit a diagnosis result signal to the communication unit 700 to deliver information on the diagnosis result to the second braking control 400 and the EPB control 600.

When an abnormality occurs in the operation of the first braking unit 100, the second braking control 400 operates in place of the first braking control 300 to generate a second hydraulic brake signal and a second valve open/close signal. Here, the second hydraulic braking signal is a signal transmitted from the second braking control 400 to the second braking unit 200 for allowing the second braking unit 200 to drive the hydraulic motor 210 to generate hydraulic pressure. Here, the second valve open/close signal is a signal that is transmitted from the second braking control 400 to the second braking unit 200 and some valves disposed in the first braking unit 100 and regulates the opening and closing of various valves in the second braking unit 200 and some valves in first braking unit 100. The second braking unit 200 may control the opening and closing of the valves according to the second valve open/close signal and supply hydraulic braking force corresponding to the second hydraulic brake signal to the third and fourth wheel brakes w3 and w4.

The second braking control 400 may control the valves included in the second braking unit 200 and the hydraulic motor 210. Particularly, the second braking control 400 may control the hydraulic flow in the flow path in the second braking unit 200 by transmitting a signal for controlling the opening and closing of the valves included in the first braking unit 100. Additionally, the second braking control 400 can diagnose whether or not the second braking unit 200 has a malfunction, and it may transmit a diagnosis result signal to the communication unit 700 for delivering the information on the diagnosis result to the first braking control 300 and the EPB control 600.

The second braking control 400 may control not only the second braking unit 200 but also the opening and closing of the pressure-reducing valve 194 in the first braking unit 100.

The second braking control 400 does not drive the hydraulic motor 210 of the second braking unit 200 when the first braking unit 100 operates normally. The second braking control 400 controls the second braking unit 200 and the pressure-reducing valve 194 upon receiving, from the communication unit 700, a signal indicating that an abnormality has occurred in the operation of the first braking unit 100. A detailed control method will be described below.

The EPB control 600 and the EPB operator 500 are braking devices, wherein the EPB control 600 signals after parking of the vehicle to cause the EPB operator 500 to provide a braking force to the first wheel and the second wheel for immobilizing the vehicle. However, the use of the EPB control 600 and the EPB operator 500 is not limited to the parking occasion, and they can be used together with the second braking unit 200 when the first braking unit 100 malfunctions. Here, the first wheel and the second wheel refer to the wheels installed with the first wheel brake w1 and the second wheel brake w2.

Upon receiving, from the communication unit 700, a signal indicating that an abnormality has occurred in the operation of the first braking unit 100, the EPB control 600 transmits a control signal to the EPB operator 500 to provide the braking force to the first and second wheels.

The first braking control 300, the second braking control 400, and the EPB control 600 may be disposed together inside an integrated control device in a vehicle, called an electronic control unit (ECU), and the respective controls may be physically isolated and placed in a separate location in the vehicle.

The communication unit 700 is a medium capable of transmitting information between the first braking control 300, the second braking control 400, and the EPB control 600. The communication unit 700 can transmit information not only to the first braking control 300, the second braking control 400, and the EPB control 600, but also other control units and sensing devices disposed in other vehicles. The communication unit 700 may be a control area network (CAN) communication.

FIGS. 4 to 8 are block diagrams illustrating flows of hydraulic pressure in a vehicle braking device according to at least one embodiment of the present disclosure.

Hereinafter, at least one embodiment of the present disclosure will be described in detail. To simplify the description of each embodiment, only one embodiment is illustrated for each situation, although the present disclosure is not limited to those illustrated.

The first main control valve 191 and the second main control valve 192 may be formed in a normally open type that is normally open when no control signal is inputted from the first braking control 300. The mixing valve 193 may be formed in a normally close type that is normally closed when no control signal is inputted from the first braking control 300.

The pressure-reducing valve 194 and the first backup valve 195 may be formed in a normally closed type that is normally closed when no control signal is inputted from the first braking control 300. Additionally, the second backup valve 196 and the third backup valve 197 may be formed in a normally open type that is normally open when no control signal is inputted from the first braking control 300.

Figure 4:
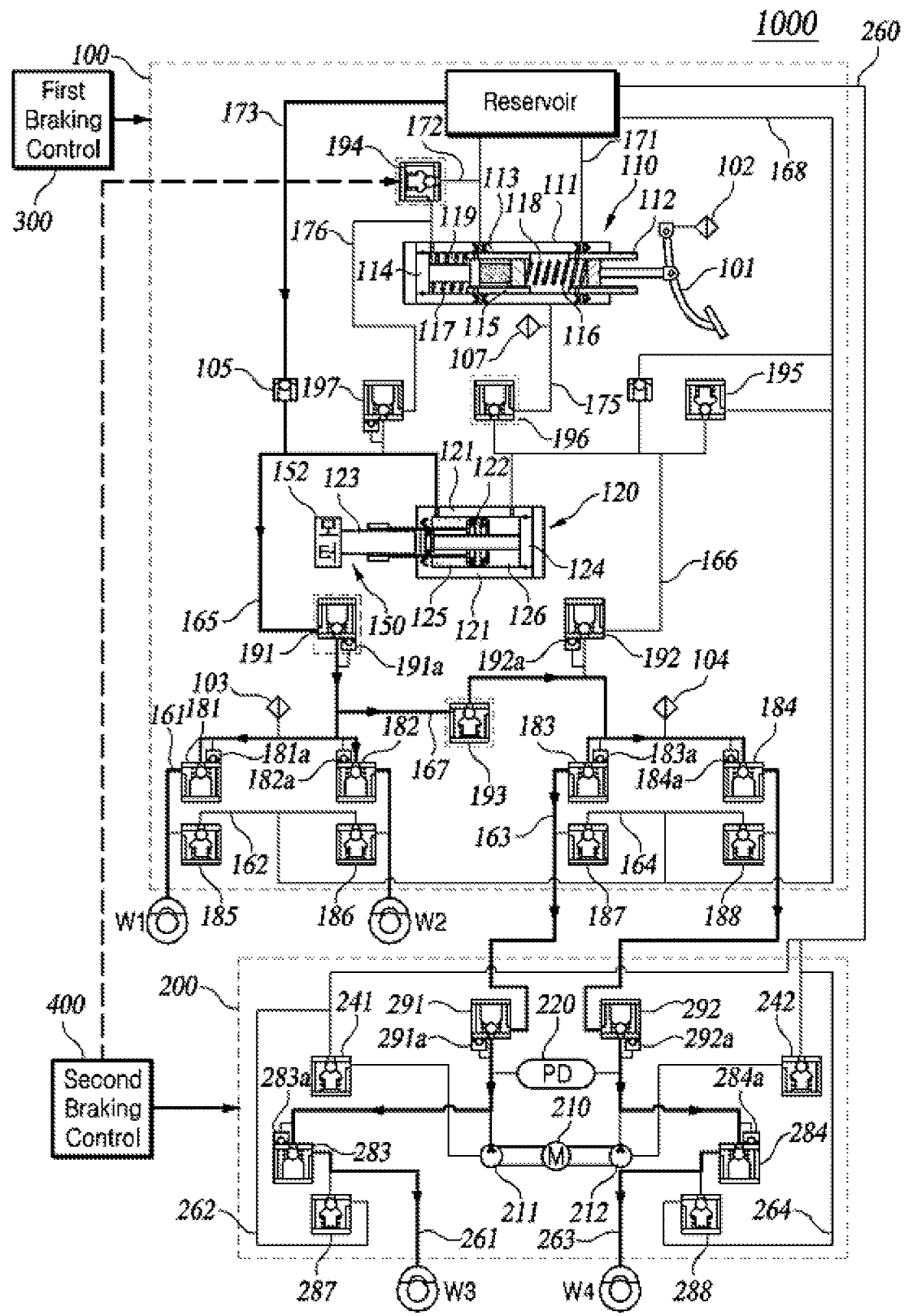
FIGS. 4 to 8 are block diagrams illustrating flows of hydraulic pressure in a vehicle braking device according to at least one embodiment of the present disclosure.

The following describes the flow of hydraulic pressure when the first braking unit 100 operates normally, as shown in FIG. 4. In particular, the flow of hydraulic oil shown in FIG. 4 illustrates at least one embodiment of a method in which the first braking unit 100 is driven when the vehicle is autonomously driven without driver intervention.

Hydraulic oil stored in the reservoir is supplied through the supply flow path 173 to the first main chamber 125 of the main master cylinder 120. When a braking situation occurs, the first braking control 300 controls the actuator 150 to supply hydraulic pressure to the plurality of wheel brakes w1, w2, w3, and w4. For this purpose, the first braking control 300 controls the actuator 150 to cause the main chamber 125 to compress its internal hydraulic oil. The hydraulic pressure generated by the compression of the hydraulic oil in the first main chamber 125 passes through the first main flow path 165 and the first brake flow path 161 to be provided to the first wheel brake w1 and the second wheel brake w2. The first braking control 300 causes the first main control valve 191, the first inlet valve 181, and the second inlet valve 182 to open for the hydraulic oil supplied from the first main chamber 125 to pass to the first and second wheel brakes w1 and w2.

Additionally, the hydraulic pressure generated by the compression of the hydraulic oil in the first main chamber 125 is transferred through the first main flow path 165, the first brake flow path 161, the mixing flow path 167, the second brake flow path 163, the third brake flow path 261, and the fourth brake flow path 263 before the hydraulic pressure is provided to the third and fourth wheel brakes w3 and w4. To allow the hydraulic oil supplied from the first main chamber 125 to pass to the third and fourth wheel brakes w3 and w4, the first braking control 300 and the second braking control 400 open the valves to go through, which are the first main control valve 191, mixing valve 193, third inlet valve 183, fourth inlet valve 184, first traction control valve 291, second traction control valve 292, fifth inlet valve 283, and sixth inlet valve 284.

When the first braking unit 100 operates normally, the hydraulic motor 210 of the second braking unit 200 is not operated. Here, the first braking control 300 has control over the pressure-reducing valve 194.

When an abnormality occurs in the operation of the first braking unit 100 and there is no braking intervention by the driver, the flow of hydraulic pressure may be illustrated as FIG. 5, which will now be described.

In this case, the first braking control 300 does not operate the actuator 150 of the first braking unit 100. The second braking control 400 performs control of closing the first traction control valve 291 and the second traction control valve 292. Additionally, the second braking control 400 performs control of opening the first high-pressure switch valve 241 and the second high-pressure switch valve 242. The second braking control 400 performs control of operating the hydraulic motor 210 of the second braking unit 200.

The first and second hydraulic pumps 211 and 212 disposed on the left and right sides of the hydraulic motor 210 are operated by the hydraulic motor 210. The first and second hydraulic pumps 211 and 212 supply hydraulic pressure to the third and fourth wheel brakes w3 and w4 by using hydraulic oil supplied from the third main flow path 260.

Since the first braking unit 100 is not operating normally, the control over the pressure-reducing valve 194 above the backup master cylinder 110 is transferred to the second braking control 400. However, when there is no driver's braking intervention, the second braking control 400 does not need to control the pressure-reducing valve 194.

Braking of the first and second wheels may be controlled by using the EPB control 600 and the EPB operator 500. In other words, the braking force of the first and second wheels is controlled by the EPB operator 500, and the braking force of the third and fourth wheels is controlled by the second braking unit 200.

When an abnormality occurs in the operation of the first braking unit 100 and the driver intervenes in the vehicle braking, the flow of hydraulic pressure may be illustrated as FIGS. 6 and 7, which will now be described.

Figure 6:
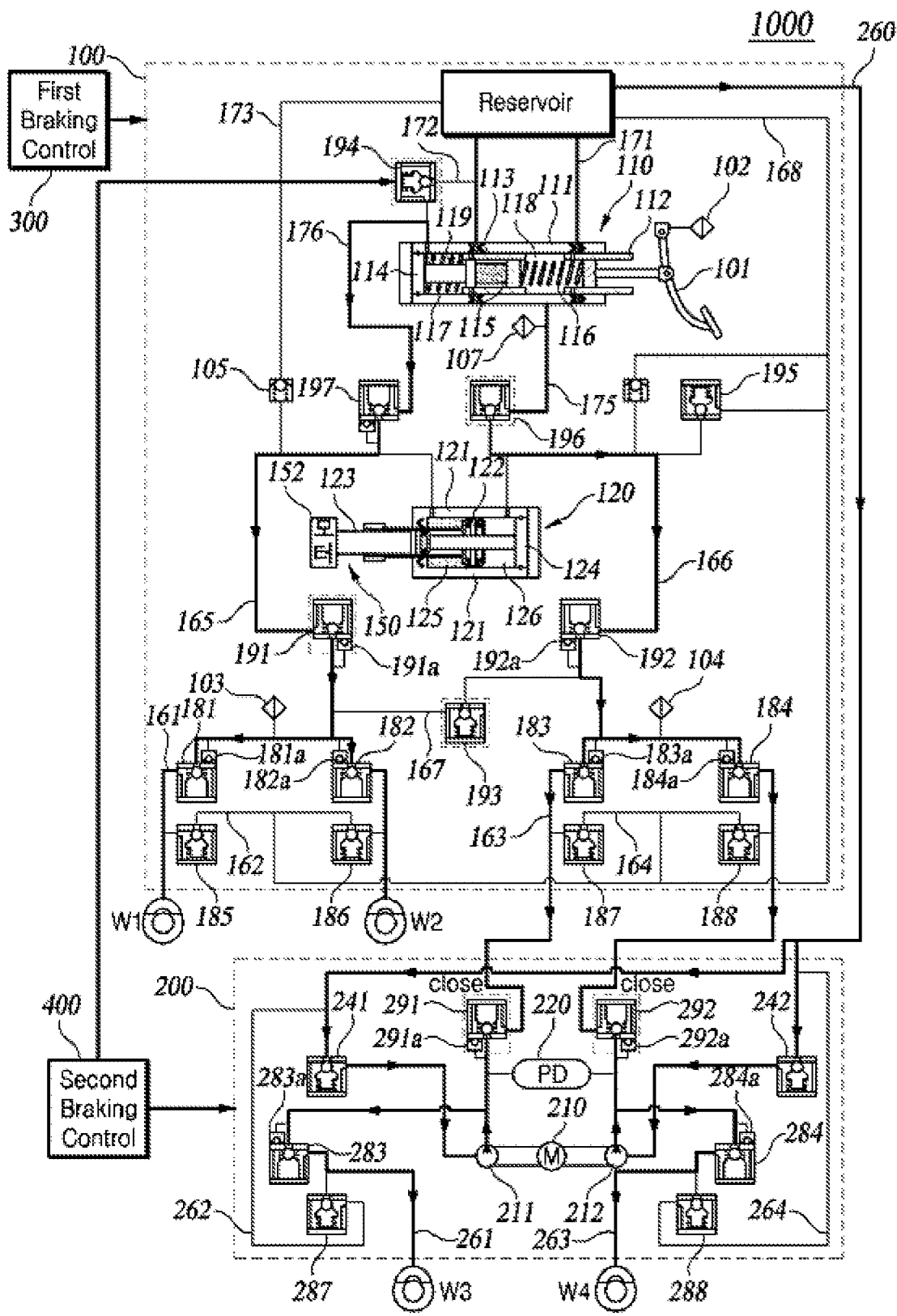

As shown in FIG. 6, in this case, the first braking control 300 does not operate the actuator 150 of the first braking unit 100. However, since the driver has depressed the brake pedal 101, hydraulic oil comes out of the second backup chamber 119 of the backup master cylinder 110, passes through the fourth backup flow path 176, first main flow path 165, and first brake flow path 161 so that the hydraulic oil delivers its hydraulic pressure to the first and second wheel brakes w1 and w2. Since the second braking control 400 controls to close the first and second traction control valves 291 and 292, hydraulic oil discharged from the first backup chamber 118 of the backup master cylinder 110 may pass through the third backup flow path 175, the second main flow path 166, and the second brake flow path 163 but is not transmitted to the second braking unit 200.

Figure 5:
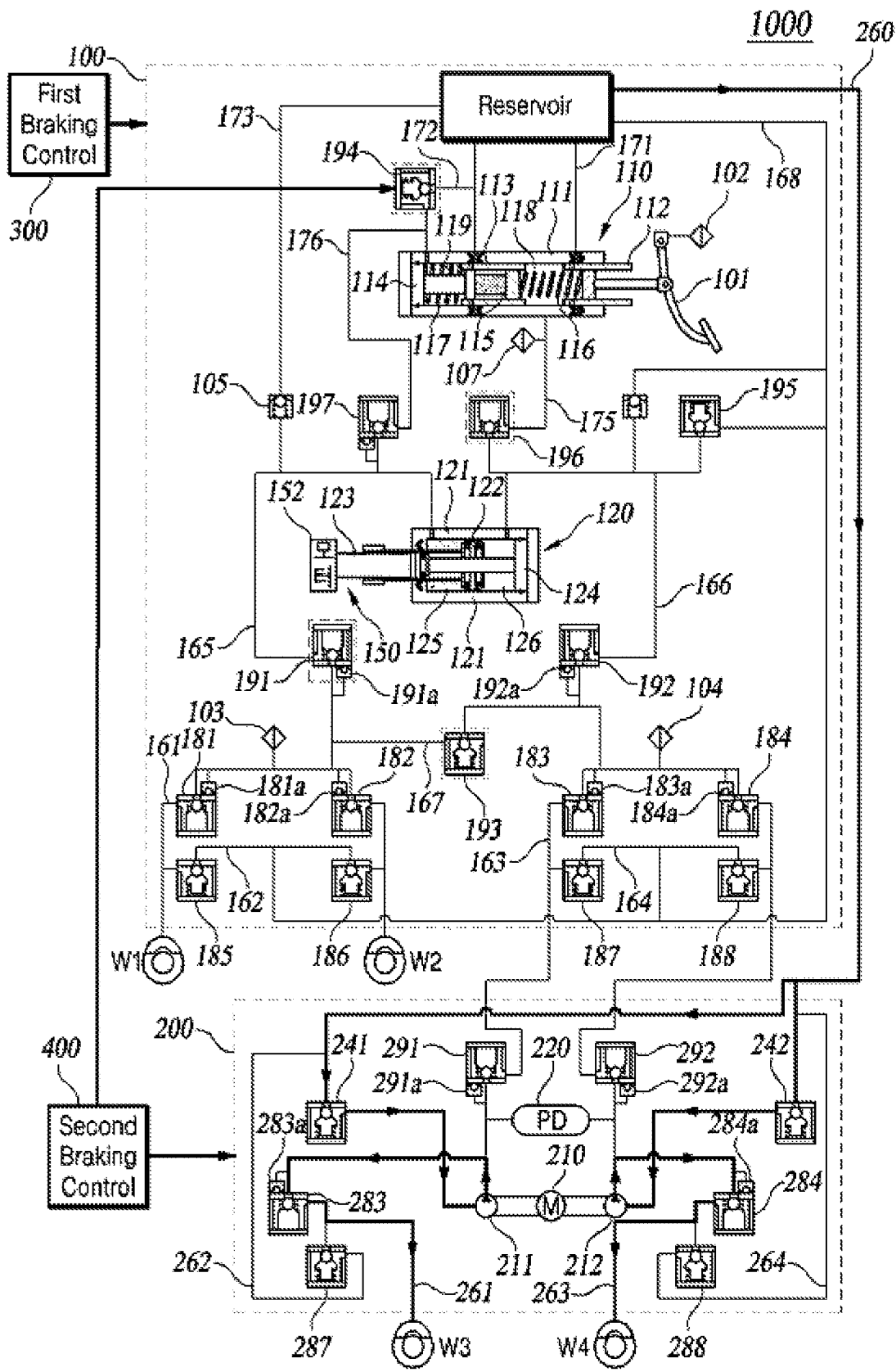

The third and fourth wheel brakes w3 and w4 may be activated by the second braking control 400 controlling the second braking unit 200 as described by referring to FIG. 5. Additionally, as described by referring to FIG. 5, the first and the second wheels may be braked by the EPB operator 500.

Here, since the first braking unit 100 is not operated, the amount of hydraulic pressure provided to the first and second wheel brakes w1 and w2 cannot be adjusted. Unable to fully control the braking force of the first and second wheel brakes w1 and w2, the vehicle may become vulnerable to a wheel lock phenomenon that occurs when braking on a low-friction road surface. Here, the wheel lock is a phenomenon in which the wheel stops rotating when the vehicle is braked. When wheel lock occurs, the vehicle loses its steering capability, increasing the risk of an accident.

Figure 7:
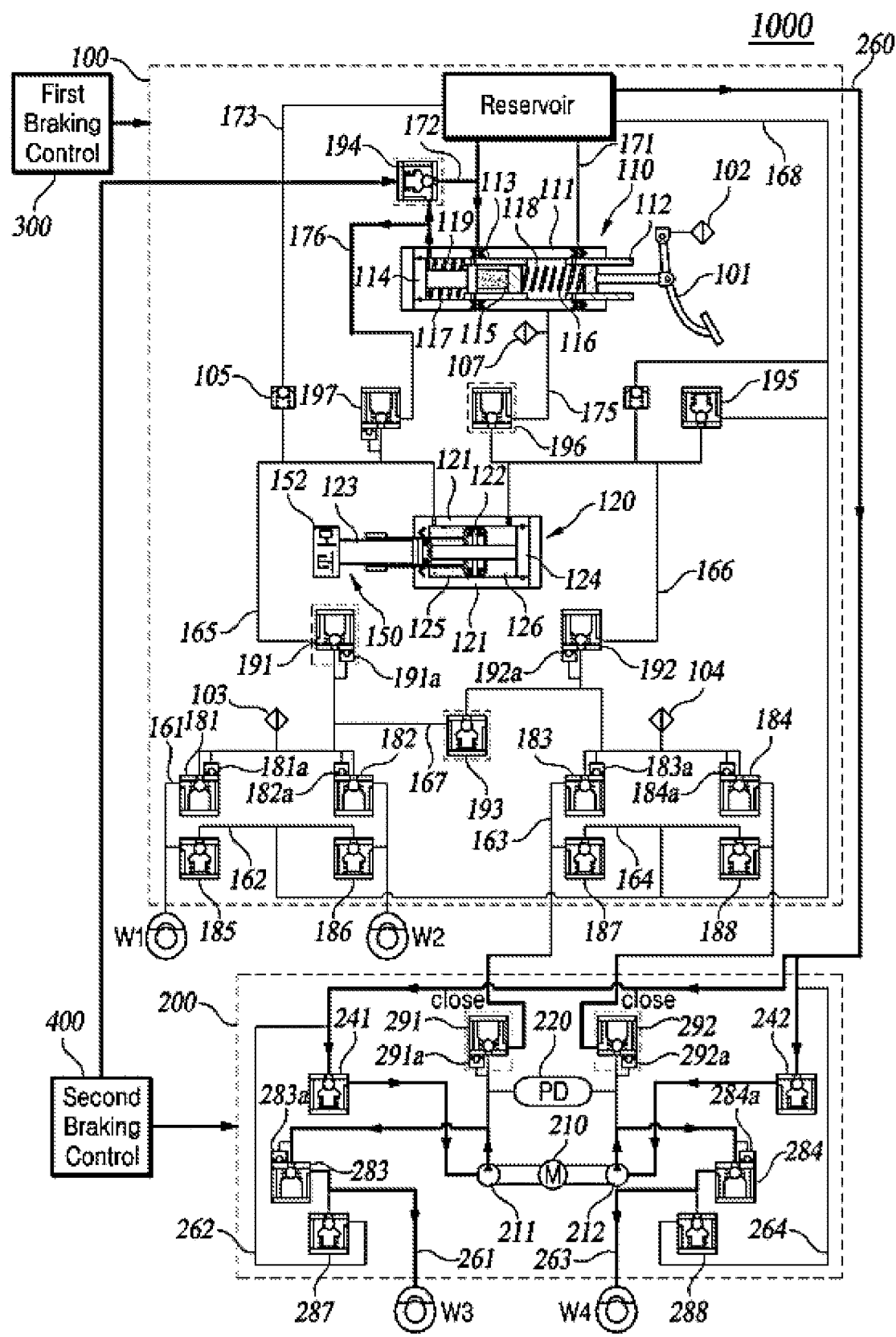

FIG. 7 discloses a method of preventing such wheel lock phenomenon. When an abnormality occurs in the operation of the first braking unit 100, the control over the pressure-reducing valve 194 is transferred to the second braking control 400. Accordingly, the second braking control 400 may reduce the hydraulic pressure supplied to the first and second wheel brakes w1 and w2 by controlling the opening and closing of the pressure-reducing valve 194. When an abnormal operation of the first braking unit 100 occurs and the driver intervenes in braking, the second braking control 400 opens the pressure-reducing valve 194 for the reservoir to recover hydraulic oil from the second backup chamber 119 of the backup master cylinder 110 and thereby reduces the hydraulic pressure supplied to the first and second wheel brakes w1 and w2.

Figure 8:
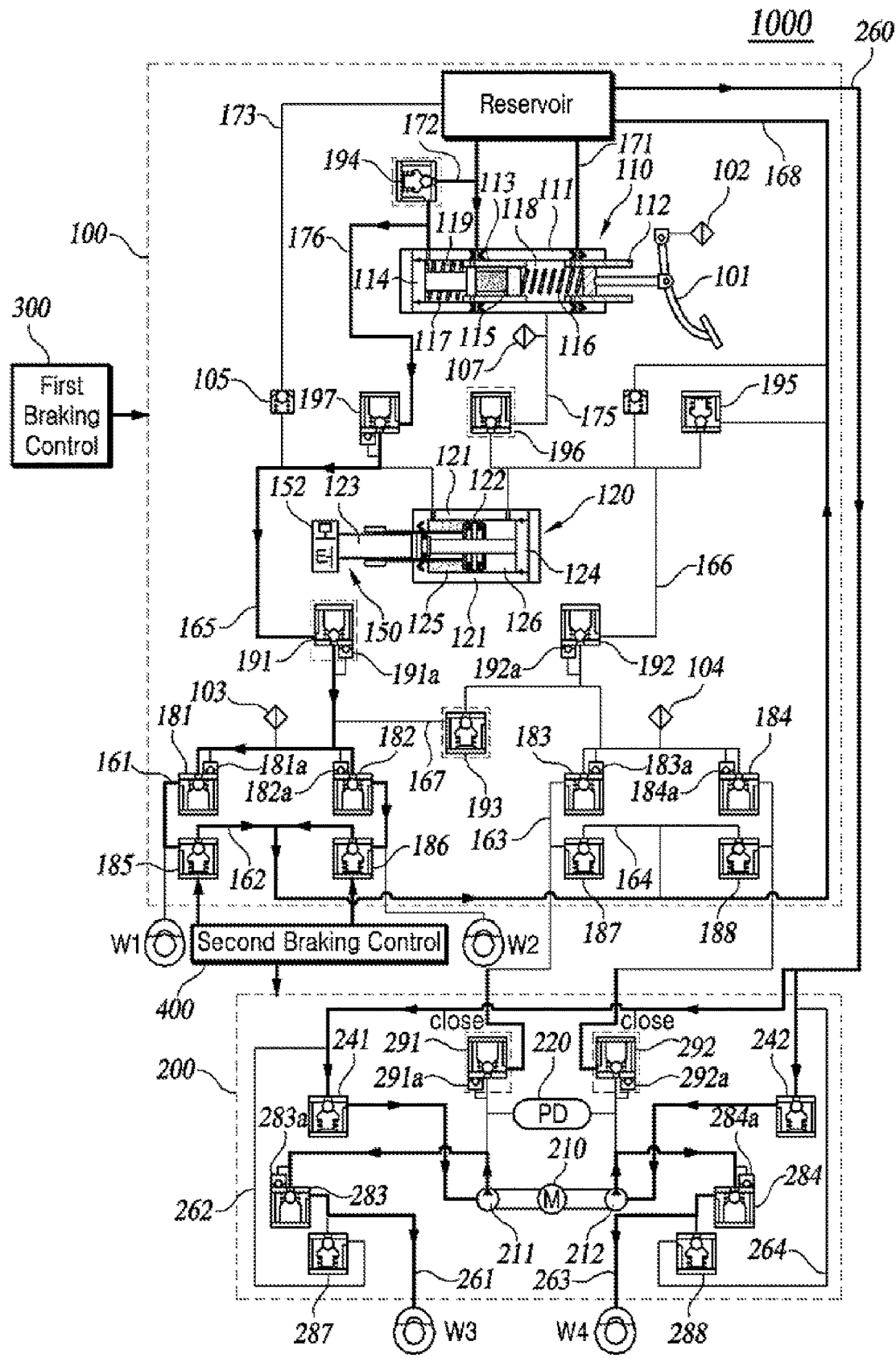

FIG. 8 discloses another method of preventing such wheel lock phenomenon. Unlike the disclosure in FIG. 7, FIG. 8 illustrates a method of preventing a wheel lock by arranging the second braking control 400 to be connected in parallel with the first outlet valve 185 and the second outlet valve 186 instead of the pressure-reducing valve 194. When the first braking unit 100 operates normally, the first and second outlet valves 185 and 186 are controlled by the first braking control 300. However, when an abnormality occurs in the operation of the first braking unit 100, the control over the first and second outlet valves 185 and 186 is transferred to the second braking control 400. Therefore, the second braking control 300 may control the opening and closing of the and second outlet valves 185 and 186 and thereby reduce the hydraulic pressure supplied to the first and second wheel brakes w1 and w2. When an abnormal operation of the first braking unit 100 occurs and the driver intervenes in braking, the second braking control 400 opens the first and second outlet valves 185 and 186 for the reservoir to recover hydraulic oil from the second backup chamber 119 of the backup master cylinder 110 and thereby reduces the hydraulic pressure supplied to the first and second wheel brakes w1 and w2.

The embodiment disclosed in FIG. 8 requires the two valves to be connected in parallel with the second braking control 400, which is more than compensated by preventing the wheel lock phenomenon of the first and second wheels without adding a new valve as with the embodiment of FIG. 7.

Although not shown, by consolidating the embodiments of FIGS. 7 and 8, the second braking control 400 may be arranged to control not only the pressure-reducing valve 194 but also the first and second outlet valves 185 and 186 to provide the vehicle braking device 1000 with higher reliability.

Figure 9:
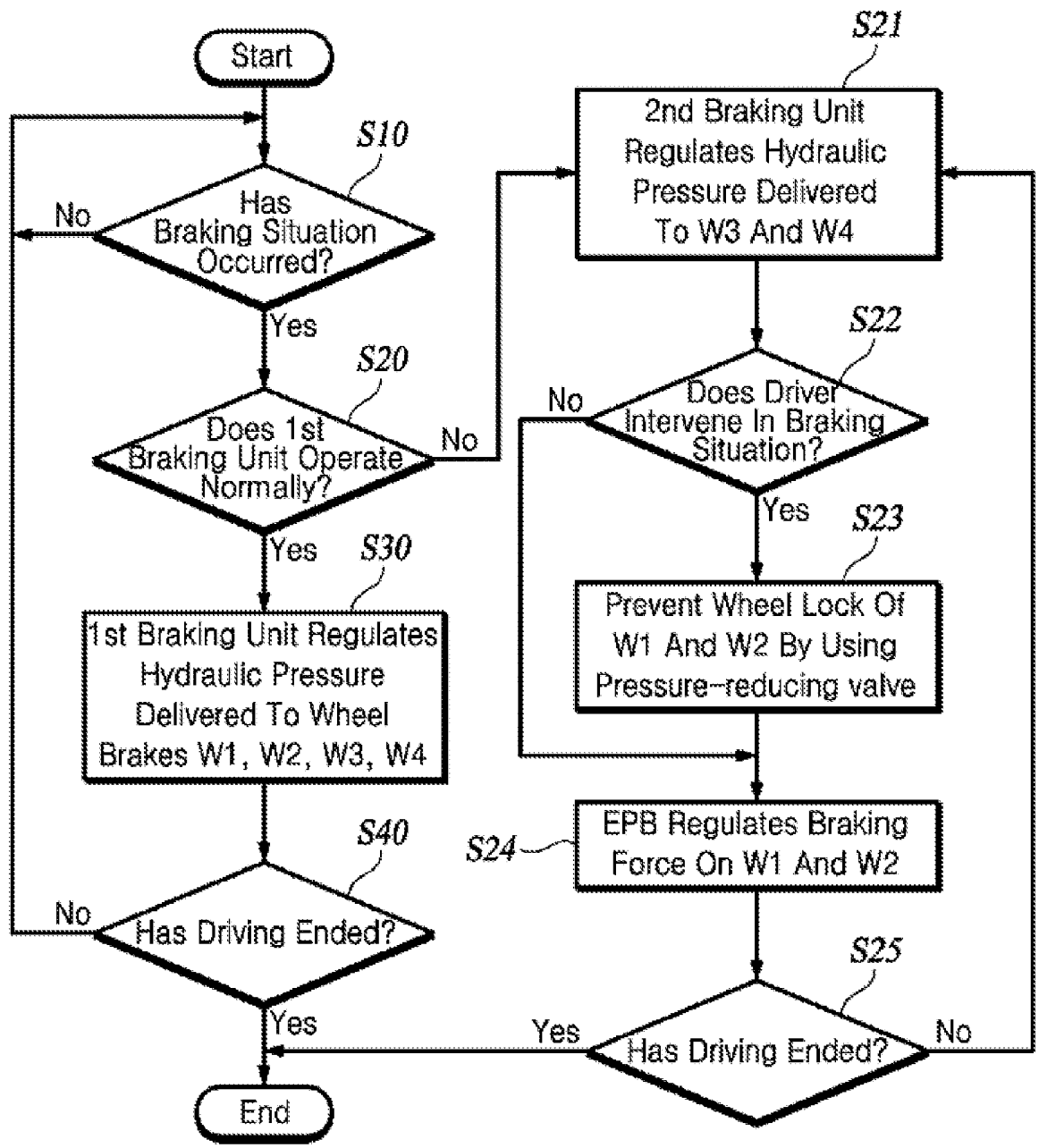
FIG. 9 is a flowchart of a braking method according to at least one embodiment of the present disclosure.

FIG. 9 is a flowchart of a braking method according to at least one embodiment of the present disclosure.

A determination is made on whether a braking situation has occurred while the vehicle is driving (S10). Upon determining that no braking situation has occurred while driving the vehicle, Step S10 is repeated. Although not shown in FIG. 8, when the vehicle has finished driving during the repetition of Step S10, the present algorithm is terminated.

Upon determining that a braking situation has occurred while driving the vehicle, it is determined whether the first braking unit 100 operates normally (S20). Upon determining that the first braking unit 100 operates normally, the first braking unit 100 performs control to regulate the hydraulic pressure delivered to the plurality of wheel brakes w1, w2, w3, w4 (S30).

After Step S30, it is determined whether the vehicle has finished driving (S40). Upon determining that the vehicle has not finished driving, the process returns to Step S10. Upon determining that the vehicle has finished driving, the algorithm is terminated.

In Step S20, upon determining that the first braking unit 100 does not operate normally, the second braking unit 200 performs control to regulate the hydraulic pressure delivered to the third and fourth wheel brakes w3 and w4 (S21).

A determination is made on whether the driver intervenes in the braking situation by depressing the brake pedal 101 while the second braking unit 200 regulates the hydraulic pressure delivered to the third and fourth wheel brake w3 and w4 (S22).

Upon determining that the driver has intervened in the braking situation, the opening/closing of the pressure-reducing valve 194 is controlled so that the wheel lock phenomenon does not occur in the first and second wheels (S23). Upon determining that the driver has not intervened in the braking situation, Step S23 is omitted.

The electronic parking brake (EPB) controls to regulate the braking force of the first wheel and the second wheel (S24). Here, Steps S21 to S23 and S24 are not necessarily performed in the order disclosed in the drawings, but they may be performed simultaneously or in the reverse order.

After Step S24, it is determined whether the vehicle has finished driving (S25). Upon determining that the vehicle has not finished driving, the process returns to Step S21. Upon determining that the vehicle has finished driving, the algorithm is terminated.

As described above, according to some embodiments of the present disclosure, when the first braking unit 100 malfunctions, the wheel lock phenomenon of the first wheel and the second wheel can be prevented without adding a new component in the second braking unit 200 to reduce the production cost thereof.

As described above, according to some embodiments of the present embodiment, when an abnormal operation of the first braking unit occurs and the vehicle is suddenly braked using the second braking unit, the vehicle braking device can prevent wheel locks caused by the driver's depression of the brake pedal by reducing the hydraulic pressure supplied to the remaining wheel brakes that are not controlled by the second braking unit through controlling the opening and closing of the pressure-reducing valve.

As described above, according to some embodiments of the present embodiment, when an abnormal operation of the first braking unit occurs and the vehicle is suddenly braked using the second braking unit, the vehicle braking device can prevent wheel locks caused by the driver's depression of the brake pedal by reducing the hydraulic pressure supplied to the remaining wheel brakes that are not controlled by the second braking unit through controlling the opening and closing of the first and second outlet valves.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A braking device for a vehicle having first, second, third and fourth wheel brakes for braking the vehicle, the braking device comprising:
   a first braking control unit configured to generate a first hydraulic braking signal and a first valve open/close signal for braking the vehicle;
   a first braking unit including a reservoir, a backup master cylinder, a main master cylinder and a plurality of first valves including a pressure-reducing valve disposed between the reservoir and the backup master cylinder, the first braking unit configured to, responsive to the first valve open/close signal, selectively open at least one of the plurality of first valves to supply a hydraulic braking force corresponding to the first hydraulic braking signal to one or more of the first, second, third and fourth wheel brakes;
   a second braking control unit configured to, responsive to an occurrence of an abnormality at the first braking unit, generate a second hydraulic braking signal and a second valve open/close signal in place of the first hydraulic braking signal and the first valve open/close signal generated by the first braking control unit;
   a second braking unit including a plurality of second valves and configured to, responsive to the second valve open/close signal, selectively open at least one of the plurality of second valves to supply a hydraulic braking force corresponding to the second hydraulic braking signal to the third and fourth wheel brakes; and
   an electronic parking brake (EPB) control unit and an EPB operator configured to supply a parking braking force to the first and second wheel brakes,
   wherein the second braking control unit is in communication with the pressure-reducing valve of the first braking unit and configured to, responsive to the occurrence of the abnormality at the first braking unit, (1) take control over opening and closing the pressure-reducing valve from the first braking control unit and (2) depressurize a hydraulic pressure supplied to the first and second wheel brakes when the second braking unit is being driven,
   wherein the second braking control unit is configured to, responsive to the occurrence of the abnormality at the first braking unit and a driver depressing a brake pedal, transmit, to the pressure-reducing valve, the second valve open/close signal to open the pressure-reducing valve for recovering hydraulic oil from the backup master cylinder to the reservoir to thereby reduce the hydraulic pressure supplied to the first and second wheel brakes, and
   wherein the EPB control unit is configured to, responsive to the occurrence of the abnormality at the first braking unit, transmit, to the EPB operator, an EPB signal corresponding to the parking braking force to brake the first and second wheel brakes.

2. The braking device of claim 1, wherein the first braking unit further comprises:
   a main control valve configured to regulate a hydraulic pressure supplied from the backup master cylinder or the main master cylinder; and
   a backup valve configured to regulate a hydraulic pressure between the backup master cylinder and the main master cylinder.

3. The braking device of claim 1, wherein the second braking unit further comprises:
   a traction control valve configured to regulate a hydraulic pressure supplied from the first braking unit to the second braking unit;
   a high-pressure switch valve configured to regulate a hydraulic pressure supplied from the reservoir to the second braking unit; and
   a hydraulic motor and a hydraulic pump configured to drive the second braking unit.

4. The braking device of claim 3, wherein the second braking control unit is configured to, responsive to the occurrence of the abnormality at the first braking unit, transmit, to the second braking unit, the second valve open/close signal for closing the traction control valve and opening the high-pressure switch valve.

5. The braking device of claim 1, further comprising:
   a communication unit configured to transmit and receive information pertaining to the first braking unit, the second braking unit, and the EPB operator via the first braking control unit, the second braking control unit, and the EPB control unit.

6. A method of controlling a braking device including (1) first, second, third and fourth wheel brakes for braking a vehicle, (2) a first braking unit configured to brake the vehicle, and (3) a second braking unit configured to brake the vehicle independently of the first braking unit, the method comprising:
   in response to detecting an occurrence of a braking situation while the vehicle is being driven, determining whether the first braking unit is operating normally;
   in response to determining that the first braking unit is failing to operate normally while the vehicle is being driven, braking the vehicle by operating the second braking unit to supply a hydraulic pressure to the third and fourth wheel brakes, and
   in response to determining that a driver has intervened in the braking situation, opening a pressure-reducing valve from the first braking unit to prevent a wheel lock from occurring at the first and second wheel brakes and recover hydraulic oil from a backup master cylinder to a reservoir, thereby reducing a hydraulic pressure supplied to the first and second wheel brakes.

7. The method of claim 6, wherein:
   the second braking unit comprises:
      a traction control valve configured to regulate a hydraulic pressure supplied from the first braking unit to the second braking unit; and
      a high-pressure switch valve configured to regulate a hydraulic pressure supplied from the reservoir to the second braking unit, and braking the vehicle further comprises:
   closing the traction control valve to regulate the hydraulic pressure supplied from the first braking unit to the second braking unit; and
   opening the high-pressure switch valve to regulate the hydraulic pressure supplied from the reservoir to the second braking unit.

8. A braking device for a vehicle having first, second, third and fourth wheel brakes for braking the vehicle, the braking device comprising:
   a first braking control unit configured to generate a first hydraulic braking signal and a first valve open/close signal for braking the vehicle;
   a first braking unit comprising a plurality of first valves and configured to control a hydraulic pressure supplied to the first, second, third and fourth wheel brakes, the plurality of first valves including first, second, third and fourth inlet valves and first, second, third and fourth outlet valves, the first braking unit configured to, responsive to the first valve open/close signal, selectively open at least one of the plurality of first valves to supply a hydraulic braking force corresponding to the first hydraulic braking signal to one or more of the first, second, third and fourth wheel brakes;
   a second braking control unit configured to, responsive to an occurrence of an abnormality at the first braking unit, generate a second hydraulic braking signal and a second valve open/close signal in place of the first hydraulic braking signal and the first valve open/close signal generated by the first braking control unit;
   a second braking unit comprising a plurality of second valves, the second braking unit configured to, responsive to the second valve open/close signal, selectively open at least one of the plurality of second valves to supply a hydraulic braking force corresponding to the second hydraulic braking signal to the third and fourth wheel brakes; and
   an electronic parking brake (EPB) control unit and an EPB operator configured to supply a parking braking force to the first wheel brake and the second wheel brake,
   wherein the second braking control unit is in communication with the first and second outlet valves of the first braking unit and configured to, responsive to the occurrence of the abnormality at the first braking unit, take control over opening and closing the first and second outlet valves from the first braking control unit and depressurize the hydraulic pressure supplied to the first and second wheel brakes when the second braking unit is being driven;
   wherein the second braking control unit is configured to, responsive to the occurrence of the abnormality of the first braking unit and a driver depressing a brake pedal, transmit to the first and second outlet valves, the second valve open/close signal to open the first and second outlet valves for recovering hydraulic oil from a backup master cylinder to a reservoir to thereby reduce the hydraulic pressure supplied to the first and second wheel brakes, and
   wherein the EPB control unit is configured to, responsive to the occurrence of the abnormality at the first braking unit, transmit an EPB signal corresponding to the parking braking force to the EPB operator to brake the first wheel brake and the second wheel brake.

* * * * *